United States Patent [19]

Murakami

[11] Patent Number: 4,875,703
[45] Date of Patent: Oct. 24, 1989

[54] DOUBLE LINK TYPE SUSPENSION INCLUDING A STABILIZER BAR

[75] Inventor: Takuya Murakami, Atsugi, Japan

[73] Assignee: Nissan Motor Co., Ltd., Yokohama City, Japan

[21] Appl. No.: 133,470

[22] Filed: Dec. 15, 1987

[30] Foreign Application Priority Data

Dec. 16, 1986 [JP] Japan .............................. 61-193391[U]

[51] Int. Cl.$^4$ ................................................ B60G 3/06
[52] U.S. Cl. .................................... 280/665; 280/689; 280/696
[58] Field of Search .............. 280/690, 691, 693, 696, 280/666, 665, 660, 662, 663, 667, 670, 672, 673

[56] References Cited

U.S. PATENT DOCUMENTS

| | | | |
|---|---|---|---|
| 2,734,753 | 2/1956 | Lind | 280/673 |
| 3,630,303 | 12/1971 | Froumajou | 280/666 |
| 4,369,988 | 1/1983 | Takagi | 280/689 |
| 4,538,831 | 9/1985 | Kami et al. | 280/666 |
| 4,632,423 | 12/1986 | Tanahashi | 280/665 |
| 4,753,455 | 6/1988 | Murakami et al. | 280/663 |
| 4,802,688 | 2/1989 | Murakami et al. | 280/666 |
| 4,810,002 | 3/1989 | Kakimoto et al. | 280/666 |

FOREIGN PATENT DOCUMENTS

| | | |
|---|---|---|
| 649019 | 8/1937 | Fed. Rep. of Germany . |
| 32-864 | 2/1957 | Japan . |
| 59-96007 | 6/1984 | Japan . |
| 60-135314 | 7/1985 | Japan . |
| 62-46363 | 10/1987 | Japan . |
| 7807321 | 1/1980 | Netherlands ......................... 280/667 |

Primary Examiner—Charles A. Marmor
Assistant Examiner—Karin Tyson
Attorney, Agent, or Firm—Foley & Lardner, Schwartz, Jeffery, Schwaab, Mack, Blumenthal & Evans

[57] ABSTRACT

A double link type front suspension system for an automotive vehicle of the front engine front drive type or the four wheel drive type. The suspension system is comprised of upper and lower control arms adapted to connect a steering knuckle with a vehicle body. An extension member is movably connected at its upper end section with the upper control arm and at its lower end section with the upper section of the knuckle. Such a relative rotation between the extension member lower end section and the knuckle upper section is made around a straight line (steering axis) passing through a ball joint for connecting the knuckle lower section with the lower control arm. Additionally, a stabilizer bar is connected at its end section with the extension member lower end section, thereby preventing the stabilizer bar end section from its swing-around motion.

23 Claims, 3 Drawing Sheets

DOUBLE LINK TYPE SUSPENSION INCLUDING A STABILIZER BAR

BACKGROUND OF THE INVENTION

1. Field of the Invention

The present invention relates generally to a double link type suspension system, for example, in use for an automotive vehicle, and more particularly to a double wish-bone type suspension system having upper and lower control arms and a shock absorber installed between a vehicle body side and a wheel side.

2. Description of the Prior Art

In connection with automotive vehicles, a variety of double link type suspension systems have been proposed and put into practical use as disclosed, for example, in Japanese Patent Provisional Publication No. 59-96007 (referred hereinafter to as "the first prior art") and in Japanese Patent Provisional (First) Publication No. 60-135314 (referred hereinafter to as "the second prior art"). In a suspension system of the first prior art, an upper section of a knuckle is upwardly extended over a wheel to form an upper end thereof, which upper end is connected through an upper control arm to a vehicle body. In a suspension system of the second prior art, an upper control arm is prolonged as compared with as usual, and a steering axis (kingpin axis) is set relardless of the upper control arm.

Additionally, there exists an automotive structure (not of double link type) (referred to as "the third prior art") in which an end section of a stabilizer bar is attached to a strut whose lower end is secured to a steering knuckle so that torsion is applied to the stabilizer bar along with vertical movement of wheels.

Now in order to obtain a suitable suspension geometry, the upper control arm of the double link type suspension system is required to ensure a considerable length and therefore cannot be so shortened. In addition, it is desirable that steering effort or force required for steering is always equal in any steering angle within a range from the minimum to maximum steering angles.

The above-summarized prior arts will be further discussed. In the case of the first prior art suspension system, the inboard end of the upper control arm is supported to a vehicle body while the outboard end of the same is connected to the upper end of the knuckle, and additionally the upper control arm cannot be shortened for the above-mentioned reason, thereby allowing a wheel house to extend to the side of an engine compartment in accordance with the length of the upper arm. In addition, a shock absorber is disposed generally parallel with the upwardly extended knuckle upper section. Thus, the width of the wheel house is enlarged thereby to unavoidably minimize the width of the engine compartment. Particularly in this first prior art suspension system, since the knuckle disposed parallel with the shock absorber is turned together with the wheel during steering, a sufficient wide space is necessary between them in order to prevent interference therebetween during turning of the vehicle. This particularly enlarges the width of the wheel house. Furthermore, the turning of the knuckle together with the wheel requires a ball joint large in height dimension for connection between the upper end of the knuckle and the upper control arm, so that the height of the wheel house is unavoidably enlarged.

In the case of the second prior art suspension system, the distance between the upper and lower control arms is relatively small, variation of camber angle and caster angle due to assembly error of suspension system component parts comes out in a relatively high value. Additionally, such camber angle and caster angle largely change depending upon vertical swing of the upper and lower control arms. These provide an insufficient controllability of vehicle steering.

Furthermore, in the case of the third prior art suspension system which is constructed such that the stabilizer bar end section is attached to the tube of a shock absorber in the strut, the installation section of the stabilizer bar unavoidably swings around with the strut which turns during vehicle steering, so that elasticity of the stabilizer bar causes steering effort or force from variation. In order to prevent such swing-around motion of the stabilizer end section, a mechanism for absorbing the swing-around motion is necessary between the stabilizer bar end section and the strut, thereby complicating the structure and raising production cost of the suspension system.

SUMMARY OF THE INVENTION

An object of the present invention is to provide an improved double link type suspension system for a vehicle, adapted to increase freedom of selection of location of the outboard end section of an upper control arm by separating elements for setting a steering axis and elements for setting camber angle, thereby minimizing the width and height of a wheel house as much as possible to enlarge the width of an engine compartment located thereinside while setting wheel alignment suitable; and further to prevent steering effort or force from variation due to change of steering angle.

Therefore, a double link type suspension system of the present invention is comprised of a knuckle for rotatably supporting a wheel of a vehicle. The lower section of the knuckle is movably connected to the outboard end section of a lower control arm by a joint, the inboard end section of the lower control arm being movably connected to the side of a vehicle body. The upper section of the knuckle is relatively movably connected to one end section of an extension member in such a manner that the extension member is relatively rotatable to the knuckle around a straight line passing through the above-mentioned joint between the lower control arm and the vehicle body side. The other end section of the extension member is movably connected to the outboard end section of an upper control arm whose inboard end section is connected to the vehicle body side. A shock absorber is disposed extending between the vehicle body side and side of the wheel. Additionally, a stabilizer bar is provided in such a manner that its end section is connected to the extension member.

Thus, the steering axis corresponds to the straight line passing through both the joint between the knuckle lower section and the lower control arm outboard end section and another joint between the knuckle upper section and the extension member lower end section, therefore the upper control arm can be situated regardless of the steering axis. Additionally, the component parts turnable together with the wheel (tire) are limited to ones located between both the joints, i.e., near an axle shaft of the wheel. Consequently, interference among the component parts, particularly between the extension member and the shock absorber, during steering can be suppressed as much as possible. This allows the width of the wheel house to become small thereby to enlarge the width of an engine compartment upon combination with the effect of no relation of the upper control arm to the steering axis so that a point at which the upper control arm inboard end section is attached to the vehicle body side is situated near the side section of the vehicle body. Additionally, since the extension member does not turn with the knuckle during steering, the extension member and the upper control arm can be connected with each other by a joint using an elastomeric insulation bushing, thereby minimizing the height of the joint as compared with a ball joint. This lowers the top level of the wheel house and therefore of a hood defining the engine compartment. By virtue of the structure in which the extension member does not turn with the knuckle, even if the end section of the stabilizer bar is attached to the extension member, the stabilizer bar end section never move during steering, so that vehicle body posture stabilizing function by the stabilizer bar can be completely separated from steering function.

Furthermore, variation of chamber angle (determined depending upon both the upper and lower control arms) along with vertical movement of the wheel can be suppressed to a lower value, because the upper control arm comes to no relation to setting of the steering axis and therefore can be prolonged while enlarging the distance between the upper and lower control arms by virtue of employing the extension member. This greatly contributes to setting wheel alignment appropriate.

BRIEF DESCRIPTION OF THE DRAWINGS

In the drawings, like reference numerals designate like elements and parts, in which.

DETAILED DESCRIPTION OF THE INVENTION

Figure 1:
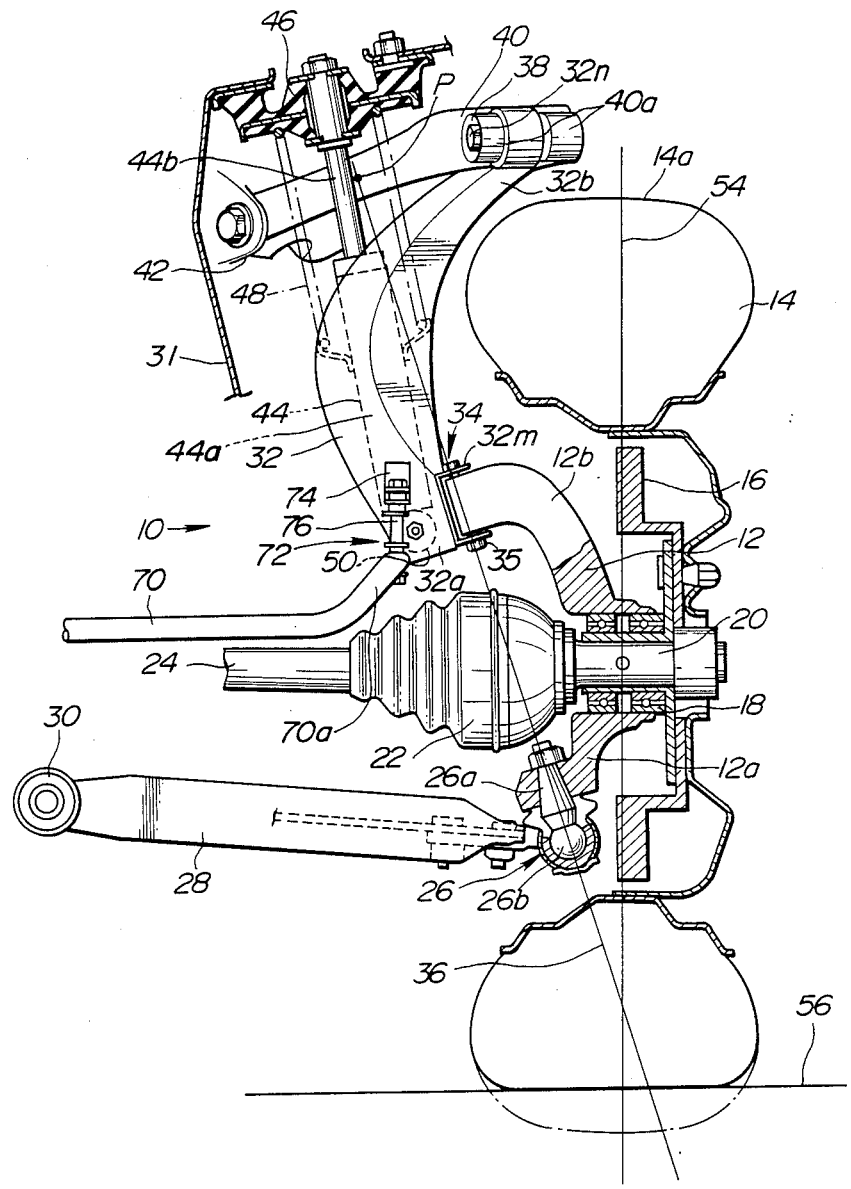
FIG. 1 is a fragmentary front elevation, partly in section, of a first embodiment of a double link type suspension system inaccordance with the present invention.
Figure 2:
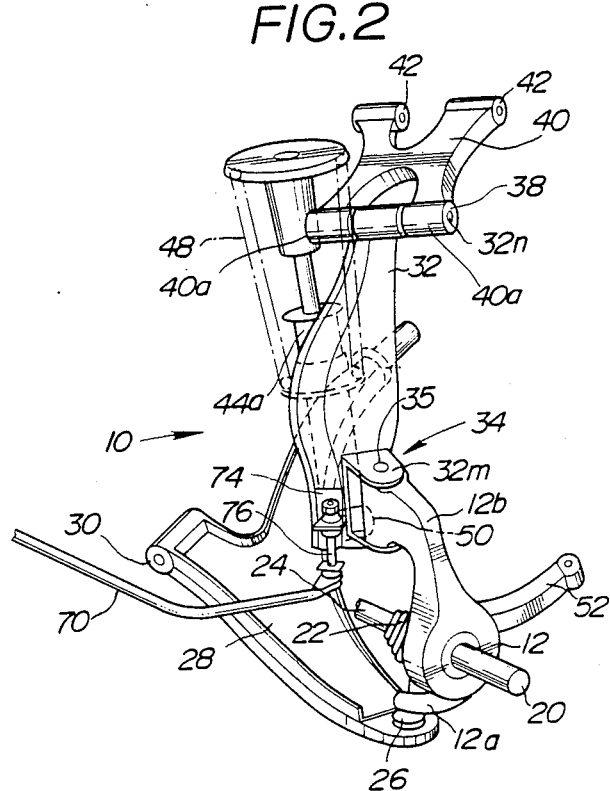
FIG. 2 is a schematic perspective view of the suspension system of FIG. 1 omitting a wheel.

Referring now to FIGS. 1 and 2, there is shown a first embodiment of a double link type suspension system 10 in accordance with the present invention. The suspension system 10 of this embodiment is a front suspension system of the double wish-bone type and is used for an automotive vehicle of the type wherein a driving force from an engine (not shown) is transmitted to front wheels (only one wheel 14 shown), for example, the front engine front drive (FF) type or the four wheel drive (4WD) type. The suspension system 10 is comprised of a steering knuckle 12 for rotatably supporting the front wheel 14 provided with a brake disc 16. The knuckle 12 rotatably journals through bearings 18 an axle shaft 20 of the wheel 14 which shaft 20 is connected through a constant velocity joint 22 to a drive shaft 24 driven under the driving force from the engine.

The lower section 12a of the knuckle 12 is connected through a ball joint 26 to the outboard end section of a lower control arm 28 whose inboard end section is connected through a rubber (elastomeric) insulation bushing 30 to a bracket (not shown) of a vehicle body 31. The ball joint 26 includes a ball stud 26a secured to the knuckle lower section 12a, and a retainer 26b which is secured to the outboard end section of the lower control arm 28. The upper section 12b of the knuckle 12 rotatably connected to an extension bracket or member 32 by a joint 34.

The joint 34 between the extension bracket lower end section 32a and the knuckle upper section 12b includes a joint bracket 32m which is secured to the lower end section 32a of the extension bracket 32 and has a generally C-shaped cross-section so as to have spaced and opposite plate sections (no numerals) which are respectively formed with openings (no numerals). The upper section 12b of the knuckle 12 extends upward and curved inward of the vehicle body in such a manner that the tip end portion thereof is situated between the opposite plate sections of the joint bracket 32m. The tip end portion of the knuckle upper section 12b is formed with a vertical through-hole (not identified). A bolt 35 is disposed so as to pass through the openings of the joint bracket opposite plate sections and the knuckle upper section through-hole. A bearing is disposed between the bolt 35 and the hole surface of the knuckle upper section 12b in order to make smooth relative rotation between the extension bracket lower end section 32a and the knuckle upper section 12b, though not shown. Accordingly, the knuckle upper section 12b is relatively rotatable to the extension bracket lower end section 32a. The axis of rotation of the joint 34 (i.e., the axis of the bolt 35a) is aligned with the axis of the ball stud 26a of the ball joint 26 to form a steering axis (kingpin axis) 36, so that relative rotation between the knuckle upper section 12b and the extension bracket lower end section 32a is made around the steering axis 36. Although the joint 34 has been shown and described as using the rolling bearings 35c, it will be appreciated that the joint may be replaced with other means for relatively rotatably connecting the knuckle 12 and the extension bracket 32 in a condition in which the axis of rotation of the joint is aligned with the steering axis 36.

The extension bracket 32 is extended upward and curved outward relative to the vehicle body 31 generally in a manner to surround the upper section of the wheel 14 so that the upper end section 32b of the extension bracket 32 reaches a position above the upper-most section 14a of the wheel 14. The extension bracket upper end section 32b is swingably connected through rubber (elastomeric) insulation bushings 38 to the outboard end section of an upper control arm 40 whose inboard end section is swingably connected through rubber (elastomeric) insulation bushings 42 to a bracket (not shown) of the vehicle body 31. It will be readily understood that bushings 38 at the joint between the extension bracket 32 and the upper control arm 40 have a thickness less than bushings 42 since extension bracket 32 is merely swingable relative to upper control arm 40.

Figure 5:
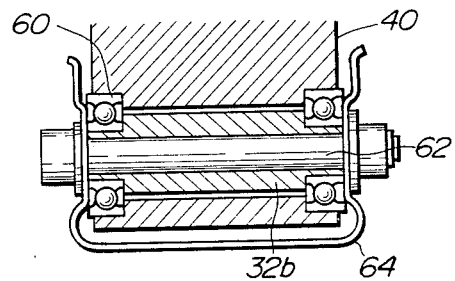
FIG. 5 is an enlarged sectional view of a modified example of a joint between the extension bracket and an upper control arm, usable in the suspension system of FIGS. 1 and 2.

The above-mentioned joint between the extension bracket upper end section 32b and the upper control arm outboard end section includes a generally horizontally extending rod member 32n secured to the tip end portion of the upper end section 32b of the extension bracket 32 in such a manner that the tip end portion is positioned at the axially central part of the rod member 32n. The two rubber insulation bushings 38 are cylindrical and securely mounted on the rod member 32n, and located spaced from each other and on the opposite sides of the tip end portion of the extension bracket upper end section 32b. The upper control arm 40 is formed at its outboard end section with two cylindrical portions 40a which are spaced from each other and securely mounted respectively on the rubber insulation bushings 38. Accordingly, relative swinging movement between the extension bracket upper end section 32b and the upper control arm outboard end section is made under distortion of the rubber insulation bushings 38. In case the distortion of the rubber insulation bushings 38 become too large owing to a smaller length of the upper control arm 40, the joint between the extension bracket end section 32b and the outboard end section of the upper control arm 40 is made up of a non-elastic rotatable arrangement as shown in FIG. 5 in which bearings 60 are interposed between the extension bracket upper end section 32b and the outboard end section of the upper control arm 40. More specifically, the extension bracket upper end section 32b is disposed within a through-hole (no numeral) formed in the outboard end section of the upper control arm 40 in such a manner that the bearings 60 are interposed between them. Additionally, a shaft 62 is disposed piercing the central through-hole of the extension bracket upper end section 32b to securely support a bracket 64 for preventing the bearings 60 and the extension bracket upper end section 32b from getting out of their positions.

A shock absorber 44 is provided to extend generally parallel with the extension bracket 32 and generally vertically installed between the vehicle body 31 and the lower end section 32a of the extension bracket 32. The shock absorber 44 includes an outer tube 44a whose lower end section is connected through a rubber (elastomeric) insulation bushing 50 to the lower end section 32a of the extension bracket 32. A piston rod 44b extending from the outer tube 44a is conected through a mount rubber 46 to the vehicle body 31. Additionally, a coil spring 48 is disposed coaxially with the shock absorber 44 and installed between the mount rubber 46 and the shock absorber outer tube 44a. In this connection, the extension bracket 32 is constructed of pressformed sheet metal and formed generally channel-shaped to have a generally C-shaped cross-section. Accordingly, the extension bracket 32 covers the outer side (near the wheel 14) of the shock absorber outer tube 44a and the lower-half of the coil spring 48 in such a manner as to surround the shock absorber 44 and the part of the coil spring 48. About half the outer periphery of the shock absorber 44 and the coil spring 48 is covered with the extension bracket 32. It will be understood that the generally channel-shaped extension bracket 32 offers a higher strength to the extension bracket itself while allowing to narrow the distance between the shock absorber 44 and the wheel 14 thereby to minimize the space occupied by them. The reference numeral 52 in FIG. 2 denotes a knuckle arm which is connected to a steering linkage (not shown) through which a steering force or effort is transmitted to the knuckle 12.

Thus, in this embodiment, a center line 54 of the wheel 14 (in the direction of width of the wheel in a cross-section including the axis of rotation of the wheel) crosses the steering axis 36 at a position above a horizontal plane 56 at which the wheel (tire) 14 is in contact with the ground or road surface as illustrated in FIG. 1. Furthermore, the steering axis 36 intersects the plane 56 at a position lying outward of the wheel center line 54 thereby to set so-called negative scrub radius. It is to be noted that since the steering axis 36 is determined by locations of both the joint between the knuckle 12 and the extension bracket 32 and the joint between the knuckle 12 and the lower control arm 28, setting the scrub radius positive, negative or zero is not related to the arrangement of the upper control arm 40. Consequently, the rubber insulation bushing 38 between the upper control arm 40 and the extension bracket 32 can be located without any restraint from the steering axis 36. In this connection, in this embodiment, the rubber insulation bushings 38 are located above the wheel 14 so as to project outward relative to the vehicle body so that the rubber insulation bushings 38 and the wheel 14 overlap each other in the direction of width of the vehicle. This ensures a sufficient length of the upper control arm 40 to obtain an optimum wheel alignment while locating the inboard end section of the upper control arm 40 at a position near the outside of the vehicle in the direction of width of the vehicle. It will be understood that this is a reason why the width of a wheel (tire) house is minimized thereby to enlarge the width of an engine compartment.

Figure 3:
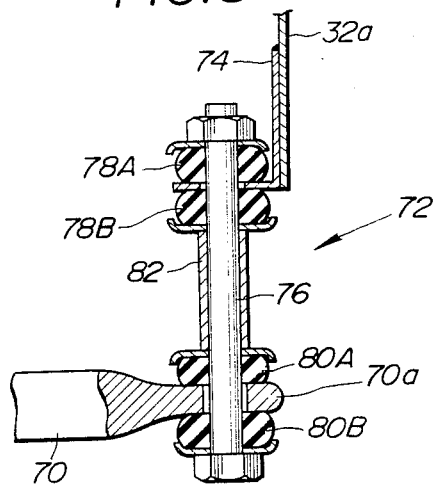
FIG. 3 is an enlarged sectional view of a joint structure between a stabilizer bar and an extension bracket of the suspension system of FIGS. 1 and 2.

A stabilizer bar 70 is provided in such a manner as to connect the extension bracket 32 of the suspension system 10 and that of another similar suspension system (not shown) which is oppositely disposed with respect to the longitudinal center axis of the vehicle body 31. The stabilizer bar 70 is secured at its central section with a frame of the vehicle body 31. More specifically, one end section 70a of the stabilizer bar 70 is securely connected to the extension bracket lower end section 32a through a joint structure 72 as shown in FIG. 3. The joint structure 72 includes an attachment bracket 74 fixedly secured to the lower end section 32a of the extension bracket 32 by known means such as welding or bolt-connection. The attachment bracket 74 is formed with an opening (no numeral). A connecting rod 76 is provided to pierce the opening of the attachment bracket 74 and an opening (no numeral) formed in the end section 70a of the stabilizer bar 70, thereby securely connecting the attachment bracket 74 and the stabilizer bar 70. Annular damping rubbers 78A, 78B are mounted on the upper end section of the connecting rod 76 in such a manner that a bracket 74 is put between them. Similarly, annular damping rubbers 80A, 80B are mounted on the lower end section of the connecting rod 76 in such a manner that stabilizer bar 76 is put between them. A spacer 82 is mounted on the connecting rod 76 and interposed between the rubbers 78B, 80A. The rubbers 78A, 80B are pressured axially inwardly to obtain secure connection of the attachment bracket 74 and the stabilizer bar end section 80a by bolt-and-nut connection using the connecting rod 76. By virtue of the damping rubbers 78A, 78B, 80A, 80B, axial vibration applied to the connecting rod 76 can be effectively damped.

Thus, ensuring the sufficient length of the upper control arm 40 minimizes the difference in length between the upper and lower control arms 40, 28 thereby making possible to obtain the optimum wheel alignment. Additionally, since the vertical distance between the upper and lower control arms 40, 28 can be enlarged, variation of camber angle and caster angle due to assembly error of the suspension component parts can be minimized while suppressing development of variation of the camber angle during vertical movement of the wheel 14. Additionally, the rigidity of both the arms 40, 28 increases proportional to the square of the distance between the both the arms, and therefore the rigidity of them is enlarged thereby improving the marginal performance of camber angle variation.

As appreciated, the weight of the vehicle body is supported by the wheel 14 through the mount rubber 46, the coil spring 48, the shock absorber outer tube 44a, the lower control arm 28 and the knuckle 12. The vertical movement of the wheel 14 can be damped under expansion and contraction of the shock absorber 44 and absorbed under deflection of the coil spring 48. here, during vertical movement of the wheel 14, the knuckle 12 and the extension bracket 32 make their vertical movement together with the wheel 14, so that the lower and upper control arms 40, 28 swing vertically. Along with this, the shock absorber 44 and the coil spring 48 make their expansion and contraction. Thus, since all such members make their vertical movement, no interference occurs between a section including the knuckle upper section 12b and the extension bracket 32 and another section including the shock absorber 44 and the coil spring 48.

It will be understood that when steering force or effort is transmitted from the steering linkage through the knuckle arm 52 integral with the knuckle 12, the knuckle 12 makes its rotation around the steering axis 36 thereby to turn the wheel 14 to steer the vehicle. At this time, the knuckle 12, wheel 14 and the axle shaft 20 turn around the steering axis 36 in which the knuckle 12 is rotatable at the joint 34 and therefore the extension bracket 32 does not turn. As a result, since the extension bracket 32 makes only the above-mentioned vertical movement along with the wheel 14 so that its relative movement to the upper control arm 40 is only swinging, a ball joint is unnecessary for the joint between the extention bracket 32 and the upper control arm 40, so that the rubber insulation bushings 38 are sufficient for this joint. The rubber insulation bushings 38 are smaller in height dimension than the ball joint, and consequently the height of the wheel house is minimized thereby lowering the level of the hood of the engine compartment. In this connection, the rubber insulation bushing is smaller by about 40 mm in height dimension than the ball joint usually used for a control arm of a double wish-bone type suspension system.

As discussed above, since no rotation movement is made in the extension bracket 32 during steering of the vehicle, no force input due to steering is applied to the stabilizer bar 70 connected to the extension bracket 32. This prevents the stabilizer bar end section 70a from swinging around even during vehicle steering in which the knuckle 12 turns. Accordingly, vehicle posture stabilizing function by the stabilizer bar 70 and steering function are completely separated from each other, thereby preventing steering effort or force from variation due to swinging movement of a stabilizer during vehicle steering.

Furthermore, the fact that no rotation is made in the extension bracket 32 during vehicle steering leads to the fact of making no relative displacement of the shock absorber 44 and the coil spring 48 to the extension bracket 32 therby to prevent interference therebetween. In this connection, the extension bracket 32 is formed channel-shaped or C-shaped in cross-section thereby surrounding the shock absorber 44 and the coil spring 48. This extremely minimizes the distance between the shock absorber 44 and the wheel 14, thus making possible to minimize the width of the wheel house thereby to enlarge the width of the engine compartment, in combination with the fact that freedom of location of the upper control arm 40 increases. It will be understood that, in this case, the shock absorber 44 and the coil sprung 48 are prevented from being injured with spring stone and the like since the shock absorber cylinder 44a and the coil spring lower part are covered or protected with the extension bracket 32.

Moreover, during vehicle starting or braking, relative displacement force developed between the vehicle body 31 and the wheel 14 acts along an extension of the steering axis 36 on the upper control arm 40. In other words, the relative displacement force is input to a point P positioned midway between the inboard and outboard end sections of the upper control arm 40. Thus, such force input is made to the position nearer to the vehicle body 31 than in a case in which the same force input is made to the outboard end section of the upper control arm 40, and therefore less load due to such force input is applied to a portion of the vehicle body 31 to which portion the inboard end section of the upper control arm 40 is attached. This makes possible to lighten the weight of the vehicle body portion to which the upper control arm is attached, and minimize the size and soften the rubber insulation bushing 42 used in the joint between the upper control arm 40 and the vehicle body 31. Such softening the rubber insulation bushing leads to an increase in absorption efficiency for vibration input from the side of the wheel 14, thus reducing vehicle vibration and booming noise due to the vibration.

While the above-discussed embodiment has been shown and described to be so arranged that the lower end section of the shock absorber 44 is connected to the knuckle upper section 12a so that the weight of the vehicle body is not supported by the lower control arm 28 thereby to minimize the rigidity of the lower control arm 28 and the rubber insulation bushing 30 and enlarge the space around the drive shaft 24, it will be appreciated that the lower end section of the shock absorber 44 may be supported to the lower control arm 28.

As a result, the suspension system of the present invention offers jointly both the advantageous effects of the above-discussed first and second prior arts, and additionally offers the unique advantageous effects summarized as follows:

(1) Since the extension member (bracket) does not turn during vehicle steering, it is possible to use the rubber insulation bushing in the joint between the upper control arm and the extension member, thereby minimizing the height of the joint as compared with the case of using a ball joint. This minimizes the height of the wheel house thereby lowering the hood of the engine compartment.

(2) Since the relative displacement force developed between the vehicle body and the wheels during vehicle starting and braking is input to the upper control arm at a position lying on the extension of the steering axis, the thus input force is applied to a location nearer to the vehicle body than in the case where the same force is input to the outboard end of the upper control arm. Accordingly, less load due to the above-mentioned input force is applied to the arm attaching portion of the vehicle body, thereby making possible weight-lightening of the vehicle body arm attaching portion and minimizing and softening of the joint. Such softening of the joint suppresses vibration transmission to the vehicle body threby to reduce booming noise due to the vibration transmission.

(3) Since setting of the steering axis can be accomplished regardless of the upper control arm, the attaching location of the upper control arm to the vehicle body can be situated outward in the direction of the vehicle body width, so that the outboard end of the upper control arm is freely selectable. Thus, the width of the engine compartment is enlarged in combination with the above-mentioned reason. Additionally, it is possible to determine the length of the upper control arm appropriate to obtain a suitable wheel alignment.

(4) Since the extension bracket does not turn during vehicle steering, the stabilizer bar connected to the extension bracket does not swing around. Accordingly, vehicle posture stabilizing function by the stabilizer bar and steering function are completely separated from each other, thereby preventing steering effort or force from variation due to swing-around movement of the stabilizer bar end section. This effectively prevents variation in steering effort or force caused along with variation in steering angle, while omitting a mechanism for absorbing swing-around movement of the stabilizer bar end section.

Figure 4:
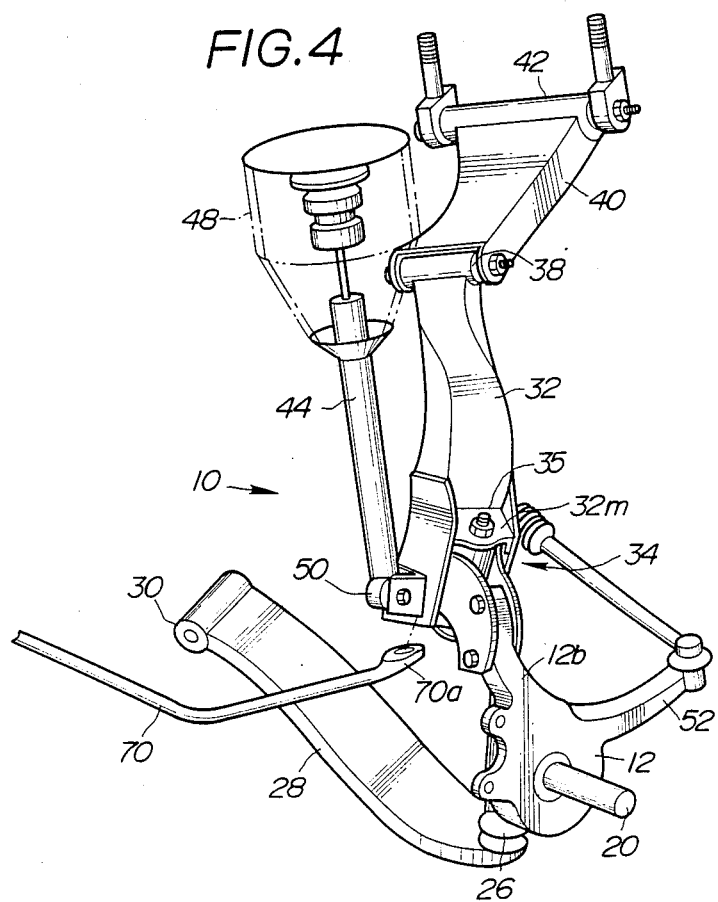
FIG. 4 is a schematic perspective view similar to FIG. 2 but showing a second embodiment of the suspension system in accordance with the present invention.

FIG. 4 illustrates a second embodiment of the suspension system 10 in accordance with the present invention, which is similar to the first embodiment with the exception that the shock absorber outer tube 44a is located outside of the extension bracket 32 and attached to the outside surface of the extension bracket 32 although the shock absorber outer tube 44a in the first embodiment is located inside the channel-shaped extension bracket 32. In this second embodiment, the shock absorber outer tube 44a is secured through the rubber insulation bushing 50 in such a manner that the axis of the shock absorber 44 inclines toward the front of the vehicle. Such inclination of the shock absorber 32 lowers a lever ratio to about 0.9 during bouncing of the wheels. This can lower the mount location of the upper end of the shock absorber 32 on the vehicle body 31, thereby reducing the height of the hood of the engine compartment while obtaining a sufficient bounding stroke of the wheels.

Furthermore, according to this embodiment, it is not necessary to form the extension bracket 32 generally channel-shaped as in the first embodiment, the extension bracket 32 may be formed into the generally hollow square pole, for example, by securing a plate member at the open section of the channel-shaped extension bracket 32. It will be understood that the hollow square pole type extension bracket 32 can be small-sized and weight-lightened as compared with the channel-shaped extension bracket 32 to obtain the same strength. Furthere, according to this embodiment, the dimension of the extension bracket 32 can be changed without changing the installation location of the coil spring 48 of the shock absorber 44, thereby facilitating adjustment of caster angle. Additionally, also in this embodiment, the stabilizer bar 70 is connected to the lower section 32a of the extension bracket 32 by means of a joint structure (not shown) similar to that shown in FIG. 3. Thus, although the second embodiment has been shown as being different in type of the upper control arm 40, the lower control arm 28, the joint 34 between the knuckle 12 and the extension bracket 32 from the first embodiment, it will be appreciated that the principle of the second embodiment is similar to that of the first embodiment, in which the upper section 12b of the knuckle 12 is rotatable around the bolt 35 so as to be relatively rotatable to the extension bracket 32 around the straight line passing through the joint 26 between the knuckle lower section 12a and the lower control arm 28.

While only the front suspension systems for the vehicle of the front engine front wheel drive type or the four wheel drive type have been shown and described, it will be understood that the principle of the present invention may be applicable to other suspensions such as a front suspension system for a vehicle of the front engine rear wheel drive type.

What is claimed is:

1. A double link type suspension system for the body of a vehicle comprising:
   a knuckle for rotatably supporting a wheel of the vehicle;
   a lower control arm having a first end section movably connected to a lower section of said knuckle by a first joint, and a second end section movably connected to a side of the vehicle body;
   an extension member having a first end section relatively movably connected to an upper section of said knuckle, said extension member being relatively rotatable to said knuckle around a straight line passing through said first joint;
   an upper control arm having a first end section movably connected to a second end section of said extension member, and a second end section connected to the side of the vehicle body;
   a shock absorber disposed extending between the side of the vehicle body and the side of said wheel, a first end section of said shock absorber being connected to the side of the vehicle body and a second end section of said shock absorber being connected to said extension member; and
   a stabilizer bar having an end section connected to said extension member.

2. A double link type suspension system as claimed in claim 1, wherein said shock absorber is disposed between the vehicle body side and said extension member first end section.

3. A double link type suspension system as claimed in claim 1, wherein said shock absorber is disposed generally vertical and near said extension member.

4. A double link type suspension system as claimed in claim 1, wherein the vehicle is of a front engine front wheel drive type.

5. A double link type suspension system as claimed in claim 1, wherein the vehicle is of a four wheel drive type.

6. A double link type suspension system as claimed in claim 1, wherein said wheel has an axle shaft connected through a constant velocity joint to a drive shaft which is driven by an engine, said axle shaft being rotatably journalled by said knuckle.

7. A double link type suspension system as claimed in claim 1, wherein said first joint is a ball joint whose axis is aligned with said straight line.

8. A double link type suspension system as claimed in claim 7, wherein said ball joint includes a ball stud secured to said knuckle lower section, said ball stud having an axis aligned with said straight line, and a retainer for movably supporting said ball stud, secured to said lower control arm.

9. A double link type suspension system as claimed in claim 1, wherein said knuckle upper section and the extension member first end section are connected by a second joint through which said straight line passes; and said extension member second end section and said upper control arm first end section are connected by a third joint, said third joint lying in a horizontal plane which also includes a point through which said straight line passes, said third joint located between a vertical plane passing through said point and a wheel vertical plane, said wheel vertical plane containing a center line of said wheel and being perpendicular to the axis of rotation of said wheel.

10. A double link type suspension system as claimed in claim 9, wherein said straight line serves as a steering axis.

11. A double link type suspension system as claimed in claim 9, wherein said point resides in said upper control arm and separate from said third joint.

12. A double link type suspension system as claimed in claim 11, wherein said straight line intersects said wheel vertical plane at a point above a horizontal plane at which said wheel is in contact with road surface.

13. A double link type suspension system as claimed in claim 12, wherein said straight line intersects said horizontal plane at a point outside of said wheel vertical plane in a lateral direction of the vehicle body.

14. A double link type suspension system as claimed in claim 1, wherein said knuckle upper section is rotatably connected to said extension member first end section to which said shock absorber second end section is connected.

15. A double link type suspension system as claimed in claim 14, wherein said shock absorber second end section is connected through an elastomeric bushing to said extension member first end section.

16. A double link type suspension system as claimed in claim 14, wherein said second joint includes a joint bracket fixedly secured to said extension member first end section, a rod member secured to said bracket, a sleeve member mounted on said rod member, means defining a through-hole in said knuckle upper section, said sleeve member being situated within said through-hole, and annular ball bearings disposed between said sleeve and said knuckle upper section.

17. A double link type suspension system as claimed in claim 1, wherein said third joint includes a rod member fixedly secured to said extension member second end section, and first and second elastomeric bushings securely mounted on said rod member and located on the opposite sides of said extension member second end section, said upper control arm first end section being mounted on said elastomeric bushings.

18. A double link type suspension system as claimed in claim 17, wherein said upper control arm first end section has first and second cylindrical portions which are respectively mounted on said first and second elastomeric bushings.

19. A double link type suspension system as claimed in claim 1, wherein said extension member is generally channel-shaped and disposed to surround at least a part of periphery of said shock absorber.

20. A double link type suspension system as claimed in claim 19, wherein said extension member is formed of a press-formed sheet metal and includes a generally vertically extending base plate portion located between said shock absorber and said wheel, and first and second side plate portions integral with said base portion and extending along said base portion, said base plate portion and first and second side plate portions defining an elongate space in which at least a part of said shock absorber is positioned.

21. A double link type suspension system as claimed in claim 1, wherein said stabilizer bar end section is connected through a fourth joint to the first end section of said extension member.

22. A double link type suspension system as claimed in claim 21, wherein said fourth joint includes a bracket fixedly secured to said extension member first end section, first and second elastomeric members disposed on opposite sides of said bracket, third and fourth elastomeric members disposed on opposite sides of said stabilizer bar end section, and a connecting rod piercing said first elastomeric members, said bracket, said second elastomeric member, said third elastomeric member, said stabilizer bar end section and said fourth elastomeric member, and means for fastening said first and second elastomeric bushings together with said bracket to said connecting rod for fastening said third and fourth elastomeric members together with said stabilizer bar end section to said connecting rod.

23. A double link type suspension system for the body of a vehicle, comprising:
   a knuckle for rotatably supporting a wheel of the vehicle;
   a lower control arm having a first end section movably connected to a lower section of said knuckle by a first joint, and a second end section movably connected to a side of the vehicle body;
   an extension member having a first end section relatively movably connected to an upper section of said knuckle, said extension member being relatively rotatable to said knuckle around a straight line passing through said first joint;
   an upper control arm having a first end section movably connected to a second end section of said extension member, and a second end section connected to the side of the vehicle body;
   a shock absorber disposed extending between the side of the vehicle body and side of said wheel, said shock absorber being connected to the side of the vehicle body and to extension member first end section; and
   a stabilizer bar having an end section connected to said extension member, the end section of said stabilizer bar being connected to the first end section of said extension member.

* * * * *